Feb. 20, 1934.　　　J. J. SINDLER　　　1,948,138
METHOD OF CREPING RUBBERIZED MATERIAL
Filed May 20, 1930
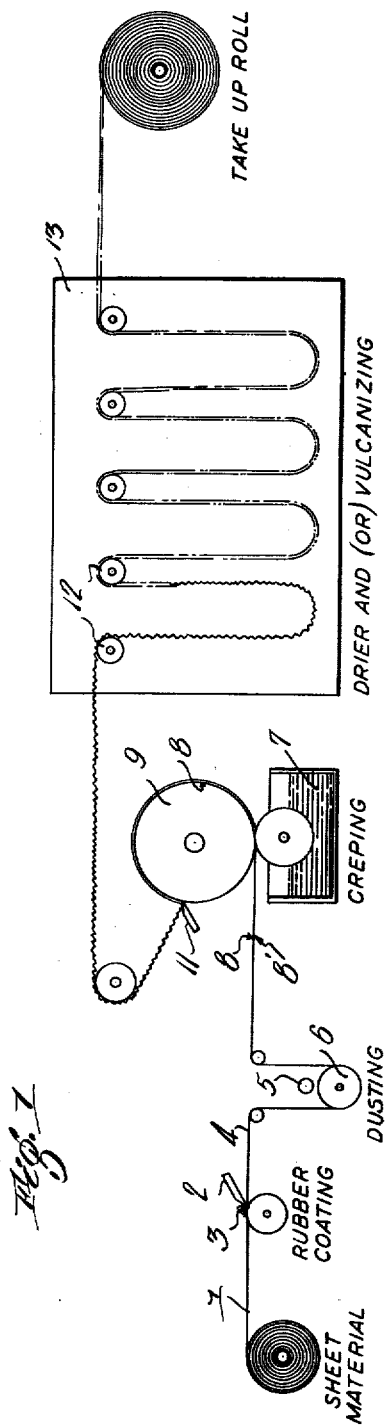

Patented Feb. 20, 1934

1,948,138

UNITED STATES PATENT OFFICE 1,948,138

METHOD OF CREPING RUBBERIZED MATERIAL

Jay J. Sindler, Framingham, Mass., assignor to Hodgman Rubber Company, Framingham, Mass., a corporation of Massachusetts Application May 20, 1930. Serial No. 453,995

9 Claims. (Cl. 154—33)

This invention relates to a coated or impregnated sheet material, such as cloth, characterized by having an elastic crepe structure and to a method of making the same.

It is well known that various fibrous materials of which the individual fibres are relatively stiff and resilient, such as paper, may be creped as by creasing; and also that soft material such as woven textiles may be given a crepe structure, as by providing irregular or uneven contraction of the threads of which it is composed. An inherent characteristic of such materials is, however, that they are not freely extensible and elastic. The former are brittle and weak, but slightly resistant to tearing, subject to softening upon wetting, and lose their crepe structure entirely upon excessive stretching. The latter materials are likewise readily wet, softened by liquids, and are not freely extensible nor elastic, in view of the shortened threads which they contain and which limit their extensibility.

Accordingly an object of the present invention is to provide a strong, resistant sheet material, such as cloth, characterized by having a foliated crepe structure which is freely extensible, elastic, and substantially permanent. It is a further object to provide a method for the obtainment of such a product. Other objects will appear from the following disclosure.

As a part of the present invention it is found that a sheet of soft, flexible material, typically a woven fabric such as cloth, may be given an elastic and substantially permanent crepe structure by treating the same with rubber or a rubber composition (which may be subject to subsequent vulcanization) creping the thus treated sheet, and finally vulcanizing the rubber compositions if required.

In such procedure, it is desirable that the material chosen shall be flexible and soft and hence relatively thin; especially for fine creping, but preferably closely woven to retain the sheet in uniform contact with the creping surface. It should also be readily and uniformly wetted by water or other liquids such as adhesive creping solutions, if such are employed, as well as by the rubber composition to be applied.

The rubber may be applied to the sheet material in the form of solutions or aqueous suspensions of rubber, such as rubber latex or dispersed crude rubber, naptha solutions, commonly known as rubber cements, plastic vulcanizable rubber compounds or in other forms which may be applied and rendered elastic in accordance with known procedures of the art. The coatings or applications employed are preferably thin, but relatively uniform distribution throughout the treated area of the sheet is desirable and also intimate adhesive contact with the surface or in the interstices of the cloth. The integument of rubber may form a continuous or discontinuous layer but preferably is coextensive with the sheet and forms a sufficiently correlated pattern to impart elasticity to the crepe structure of the sheet. The treated and creped sheet may be useful per se for some purposes, but ordinarily it is desirable to improve its elasticity, as by vulcanizing to a desired degree of cure, which may be effected in accordance with customary procedures well known in the art of vulcanization.

A typical example of the practical application of the invention will be described with respect to a sheet of cloth, coated with a plastic rubber cement, reference being made to the accompanying drawing in which Fig. 1 is a diagrammatic flow sheet of suitable apparatus for carrying out the invention; and Fig. 2 is a cross-section of the creped sheet.

Thus, a sheet of fine cotton cloth 1 may be coated, by passing under a spreader 2 according to the usual practice, with a thin layer of rubber composition such as soft rubber cement 3 for examples as follows:

|  | Lbs. |  | Cold cure | Lbs. |
|---|---|---|---|---|
| Pale crepe rubber | 30 | | Smoked sheet | 30 |
| Stearic acid | 1 | | Paraffin | 1 |
| ZnO | 30 | | Barytes | 50 |
| Clay | 20 Oz. | | Whiting | 13 |
| Whiting | 11 14 | | Ultramarine | 1 |
| Color (green) | 4 12 | | Carbon black | 5 |
| Carbon black | 1 13 | | | |
| Thionex | 4 | | | |
| Sulphur | 5 | | | |

Inasmuch as the spreading operation ordinarily applies only an extremely thin coating of rubber, the sheet may be treated with a number of successive coatings, one over the other, to produce the desired thickness. Likewise coating by means of calender rolls, or impregnating the sheet as with fluid rubber suspensions or solutions may be resorted to for the obtainment of various specific properties in the finished product.

The treated or coated sheet as provided at 4, however, is characteristically soft and flexible. It may advantageously be dusted, as with zinc stearate from a supply 5 as it passes under roll 6, and then wetted either with water or by passing through a solution of appropriate adhesive such as glue in the creping tank 7. As shown, the sheet may then be pressed firmly with its coated surface 8 (or untreated surface 8') in intimate contact with the surface of a cylindrical creping roll 9 (which may be heated) and upon revolving the latter the adhering sheet is forced against the edge of a doctor blade 11. The latter, being held firmly against the surface of the creping roll and inclined thereto at such angle as may be desired, insures complete removal of the rubber coated sheet from the roll on the one hand and on the other pushes the sheet back upon itself before completely leaving the roll, thus imparting a coarser or finer crepe structure to the sheet as may be required. The degree of fineness or coarseness of the crepe structure may be substantially controlled by the angle and shape of the doctor blade in its contact with the creping roll according to usual practice in the art of creping.

The coated and creped sheet as thus obtained is extensible but relatively soft and may be or become tacky. Accordingly, for some operations it may be shaped or otherwise manipulated and used at this stage after drying if necessary. For the production of material to be rolled up and stored, however, it is usually preferable to subject the sheet to vulcanization. This may be done by the customary procedure of vapor curing the rubber in an atmosphere of sulphur chloride,—or if a vulcanizable composition has been employed, by subjecting the sheet to vulcanizing conditions of temperature for a sufficient period of time to develop the proper cure. This may be conveniently effected, for example by conveying the creped sheet on festoons 12 through a vulcanizing chamber 13, heated to a suitable temperature and at such a rate as to provide the required time of treatment (e. g. 15 to 20 minutes) according to the cure desired.

The resulting product as indicated in Fig. 2 is characterized by having a crepe structure which is inherently soft, freely flexible and elastic; and which immediately and substantially completely resumes its contracted form upon being stretched and then released. It is soft and pliable, yet tough, may or may not be water proof and resistant and does not lose its elasticity by age or use. It is, furthermore, free from any tendency for the rubber coating and backing layers to separate inasmuch as the one is coextensive with and conforms to the other, thus preventing the occurrences of differential stresses between the two.

It is to be understood that various other adaptations of the invention may be made both with respect to materials and the mode of procedure followed. For example, either side of the treated sheet may be brought into contact with the creping roll,—the rubber coated surface or the uncoated surface. Wetting of the sheet in either case is desirable, and in case the uncoated surface is to be creped an adhesive creping bath is preferred. But both surfaces of the sheet may be treated with rubber; and likewise, two sheets may be coated and joined together upon their coated surfaces—leaving the outer surfaces coated or uncoated as the case may be,—and then creped as above described. In such procedures, however, it is generally recommended to employ a firmer adhesive or creping solution to retain the sheet firmly in position upon the creping roll for maintaining the proper creping action.

Other modifications and applications, within the invention, will occur to those skilled in the art, and are to be understood as comprehended and included by the above disclosure and in the following claims:

I claim:

1. Method of making an elastic crepe, which comprises as steps coating a soft flexible sheet material with vulcanizable rubber composition, rendering the sheet temporarily adherent and creping the same.

2. Method of making an elastic crepe, which comprises as steps coating a soft flexible sheet material with vulcanizable rubber composition, rendering the sheet temporarily adherent and creping the same upon the coated surface.

3. Method of making an elastic crepe, which comprises as steps coating a soft flexible sheet material with rubber, creping, and vulcanizing the same.

4. Method of making an elastic crepe, which comprises as steps coating a soft flexible sheet material with rubber, creping by removing the coated surface of the sheet from the creping cylinder and vulcanizing the same.

5. Method of making an elastic crepe, which comprises as steps coating a soft flexible sheet material with a vulcanizable rubber composition, creping, and subjecting the same to vulcanizing conditions.

6. Method of making an elastic crepe, which comprises as steps coating a soft flexible sheet material with a vulcanizable rubber composition, creping by removing the coated surface of the sheet from the creping cylinder, and subjecting the same to vulcanizing conditions.

7. Method of making an elastic crepe, which comprises as steps coating a soft flexible sheet of cloth with vulcanizable rubber composition, rendering the sheet temporarily adherent and creping the same.

8. Method of making an elastic crepe, which comprises as steps, coating a soft flexible sheet of cloth with rubber, creping, and vulcanizing the same.

9. Method of making an elastic crepe, which comprises as steps coating a sheet of soft flexible cloth with a thin layer of rubber cement, dusting with zinc stearate, creping by removing the coated surface of the sheet from the creping cylinder, drying, and vulcanizing.

JAY J. SINDLER.

DISCLAIMER 1,948,138.—*Jay J. Sindler*, Framingham, Mass. METHOD OF CREPING RUBBERIZED MATERIAL. Patent dated February 20, 1934. Disclaimer filed July 31, 1935, by the patentee.
Hereby enters this disclaimer to claims 1 to 8, inclusive, of said patent.
[*Official Gazette August 20, 1935.*]

may then be pressed firmly with its coated surface 8 (or untreated surface 8') in intimate contact with the surface of a cylindrical creping roll 9 (which may be heated) and upon revolving the latter the adhering sheet is forced against the edge of a doctor blade 11. The latter, being held firmly against the surface of the creping roll and inclined thereto at such angle as may be desired, insures complete removal of the rubber coated sheet from the roll on the one hand and on the other pushes the sheet back upon itself before completely leaving the roll, thus imparting a coarser or finer crepe structure to the sheet as may be required. The degree of fineness or coarseness of the crepe structure may be substantially controlled by the angle and shape of the doctor blade in its contact with the creping roll according to usual practice in the art of creping.

The coated and creped sheet as thus obtained is extensible but relatively soft and may be or become tacky. Accordingly, for some operations it may be shaped or otherwise manipulated and used at this stage after drying if necessary. For the production of material to be rolled up and stored, however, it is usually preferable to subject the sheet to vulcanization. This may be done by the customary procedure of vapor curing the rubber in an atmosphere of sulphur chloride,—or if a vulcanizable composition has been employed, by subjecting the sheet to vulcanizing conditions of temperature for a sufficient period of time to develop the proper cure. This may be conveniently effected, for example by conveying the creped sheet on festoons 12 through a vulcanizing chamber 13, heated to a suitable temperature and at such a rate as to provide the required time of treatment (e. g. 15 to 20 minutes) according to the cure desired.

The resulting product as indicated in Fig. 2 is characterized by having a crepe structure which is inherently soft, freely flexible and elastic; and which immediately and substantially completely resumes its contracted form upon being stretched and then released. It is soft and pliable, yet tough, may or may not be water proof and resistant and does not lose its elasticity by age or use. It is, furthermore, free from any tendency for the rubber coating and backing layers to separate inasmuch as the one is coextensive with and conforms to the other, thus preventing the occurrences of differential stresses between the two.

It is to be understood that various other adaptations of the invention may be made both with respect to materials and the mode of procedure followed. For example, either side of the treated sheet may be brought into contact with the creping roll,—the rubber coated surface or the uncoated surface. Wetting of the sheet in either case is desirable, and in case the uncoated surface is to be creped an adhesive creping bath is preferred. But both surfaces of the sheet may be treated with rubber; and likewise, two sheets may be coated and joined together upon their coated surfaces—leaving the outer surfaces coated or uncoated as the case may be,—and then creped as above described. In such procedures, however, it is generally recommended to employ a firmer adhesive or creping solution to retain the sheet firmly in position upon the creping roll for maintaining the proper creping action.

Other modifications and applications, within the invention, will occur to those skilled in the art, and are to be understood as comprehended and included by the above disclosure and in the following claims:

I claim:
1. Method of making an elastic crepe, which comprises as steps coating a soft flexible sheet material with vulcanizable rubber composition, rendering the sheet temporarily adherent and creping the same.
2. Method of making an elastic crepe, which comprises as steps coating a soft flexible sheet material with vulcanizable rubber composition, rendering the sheet temporarily adherent and creping the same upon the coated surface.
3. Method of making an elastic crepe, which comprises as steps coating a soft flexible sheet material with rubber, creping, and vulcanizing the same.
4. Method of making an elastic crepe, which comprises as steps coating a soft flexible sheet material with rubber, creping by removing the coated surface of the sheet from the creping cylinder and vulcanizing the same.
5. Method of making an elastic crepe, which comprises as steps coating a soft flexible sheet material with a vulcanizable rubber composition, creping, and subjecting the same to vulcanizing conditions.
6. Method of making an elastic crepe, which comprises as steps coating a soft flexible sheet material with a vulcanizable rubber composition, creping by removing the coated surface of the sheet from the creping cylinder, and subjecting the same to vulcanizing conditions.
7. Method of making an elastic crepe, which comprises as steps coating a soft flexible sheet of cloth with vulcanizable rubber composition, rendering the sheet temporarily adherent and creping the same.
8. Method of making an elastic crepe, which comprises as steps, coating a soft flexible sheet of cloth with rubber, creping, and vulcanizing the same.
9. Method of making an elastic crepe, which comprises as steps coating a sheet of soft flexible cloth with a thin layer of rubber cement, dusting with zinc stearate, creping by removing the coated surface of the sheet from the creping cylinder, drying, and vulcanizing.

JAY J. SINDLER.

DISCLAIMER 1,948,138.—*Jay J. Sindler*, Framingham, Mass. METHOD OF CREPING RUBBERIZED MATERIAL. Patent dated February 20, 1934. Disclaimer filed July 31, 1935, by the patentee.
Hereby enters this disclaimer to claims 1 to 8, inclusive, of said patent.
[*Official Gazette August 20, 1935.*]